Sheet 1 - 2 Sheets
A. B. Sprout.
Horse Rake.
No 2148 Reissued Jan. 16, 1866.
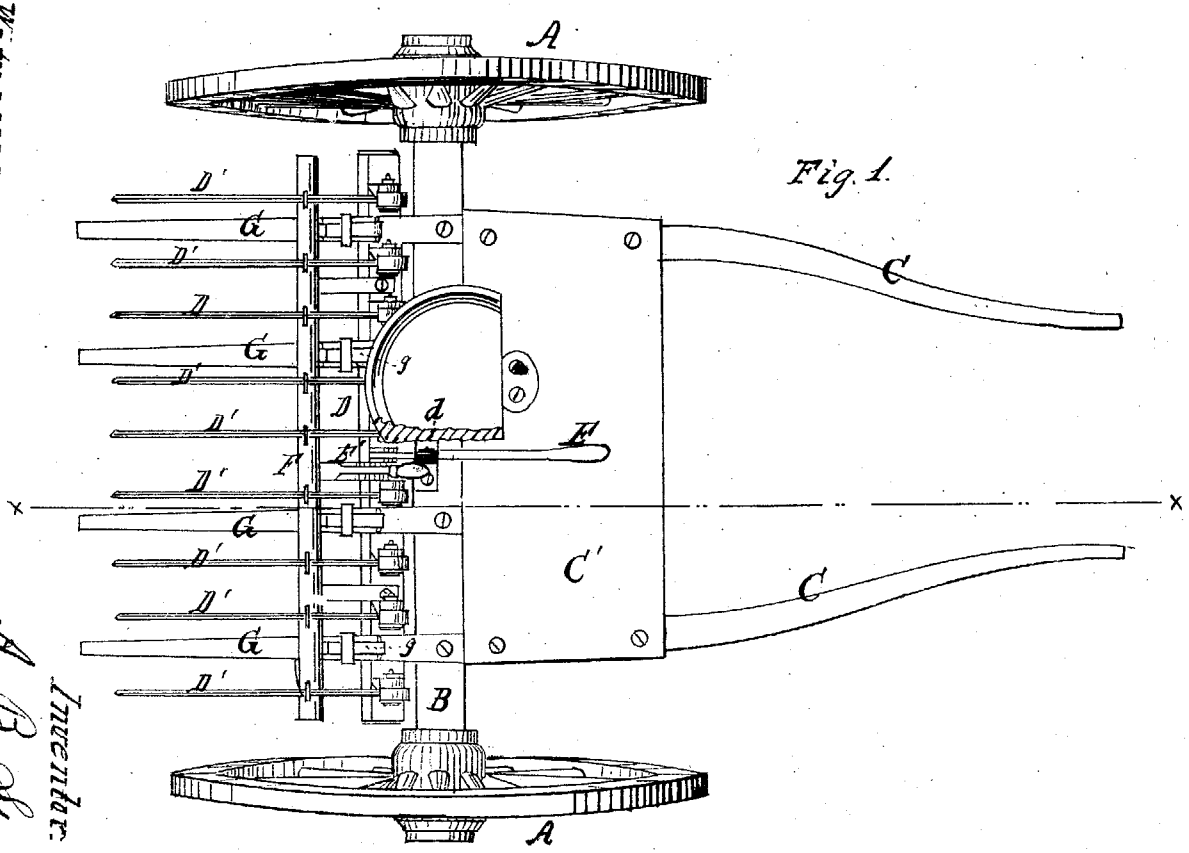
Witnesses.
Alex A. C. Klaneke
Charles D Smith
Inventor.
A. B. Sprout
By Munn & Co
Attorneys

A. B. Sprout.
Horse Rake.
No 2148 Reissued Jan. 16, 1866.
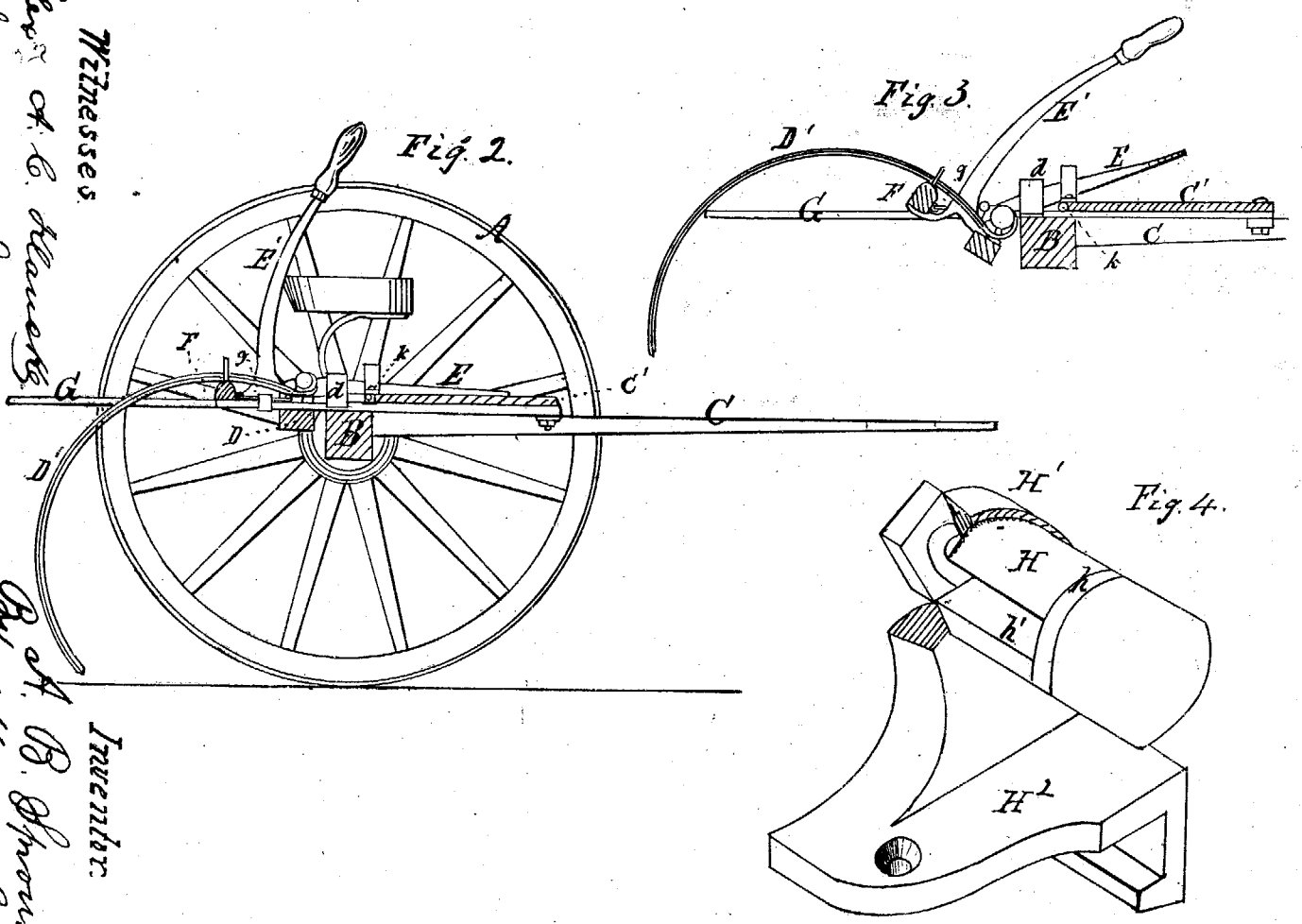
Witnesses.
Alex. A. C. Klauette
Charles D. Smith
Inventor.
A. B. Sprout.
By Munn & Co
Attorneys.

UNITED STATES PATENT OFFICE.

ARIEL B. SPROUT, OF HUGHESVILLE, PENNSYLVANIA.

IMPROVEMENT IN HORSE-RAKES.

Specification forming part of Letters Patent No. 48,109, dated June 6, 1865; Reissue No. 2,148, dated January 16, 1866.

*To all whom it may concern:*

Be it known that I, ARIEL B. SPROUT, of Hughesville, in the county of Lycoming and State of Pennsylvania, have invented a new and useful Improvement in Horse-Rakes; and I do hereby declare that the following is a full, clear, and exact description thereof, reference being had to the accompanying drawings, and to the letters of reference marked thereon.

The nature of my invention consists in a new and useful improvement in the manner of operating and pivoting the rake and attaching the teeth to the rake-head, and holding it up and the teeth down to their work, as hereinafter described and explained.

To enable others skilled in the art to make and use my invention, I will proceed to describe its construction and operation.

In the accompanying drawings, Figure 1 is a plan of a rake embodying my invention. Fig. 2 is a vertical section of the same on the line *x x*, Fig. 1. Fig. 3 is a detached sectional view, illustrating the operation of the levers hereinafter referred to, and also other parts. Fig. 4 is a perspective view of the device by which the connection between the rake head and teeth is made.

In the drawings, A A are the wheels, B the axle, and C C the thills, all of which are of common construction.

D is the rake-head, to which the teeth D′ are attached in the manner hereinafter described.

E is a foot-lever pivoted to the head D, and having its fulcrum at *d* upon the axle B or the frame C′. A roller, *k*, under the lever E, pivoted in the sides of a fixed lug or loop, reduces the friction of the said lever in raising the rake-head, and prevents it from binding as it rolls under the forward motion, which results from the pressure upon the lever E. By the depression of the forward end of the lever the rake is thrown down and held to its work, there being no direct connection between the rake-head and the frame of the machine. The lever E slides back on the roller *k* with the downward and rearward motion of the rake-head, and forward when the latter is elevated, which is done by means of a hand-lever, E′, forked at its lower end to admit of its attachment to both the rake-head D and the tumbling-bar F. The rake-teeth are held at proper distance asunder as well as braced against vertical and lateral strain by guides. The bar F is attached to the cleaners G or other rigid part of the rake by strap-hinges *g*, so that the bar F, rotating on its pivots under the forward pressure of the lever E′, allows the rake-head to descend and the rear curved ends of the teeth to rise and leave the hay. By means of the strap *g* a certain degree of vertical play is allowed to the bar F, so that in passing over knolls or similar obstructions it may rise accordingly; but in raking up heavy hay or in bunching up hay it is needful to prevent the rising up of the fulcrum-bar, by reason of the degree of play it has, owing to its attachments by the straps *g*. For this purpose I use rings, which slip upon the cleaner-bars G and embrace the strap, so as to prevent vertical action of the bar F relative to the cleaners. Thus when the hand-lever E′ is turned forward to raise and clear the rake-teeth the bar F forms the center of motion for the rake and the head D falls, as shown in Fig. 3.

From the above description it is manifest that less power or strength is required to operate the rake than if the head constituted the center of motion. When on suspending the operation the rake-teeth are elevated to their highest position, the head D assumes such position below the bar F as to partially counterbalance the backward and downward tendency of the teeth. The rake is retained in its working position by the foot upon the treadle-lever E, and is tripped or held from contact with the ground by the forward motion of the hand-lever E′.

To adapt the machine to horses of different heights I have extended the cleaners G, which support the fulcrum-bar F, forward of the axle, so that by placing blocks over their forward ends or by analogous adjustment the position of the cleaners shall be changed relatively to the shafts, so that when the latter are raised to suit a large horse the forward end of the cleaners under the foot-board may be lowered, so as to elevate the fulcrum-bar and preserve the relation of the points of the teeth to the ground. The reverse operation adapts the machine to a smaller horse.

The rake-teeth D′ are each attached to the rake through the medium of a pintle, H, formed with a flange, *h*, and a circular shank, which passes through a lug, H′, formed on a clamp, $H^2$, which is rigidly fastened to the head D in any suitable manner. The rake-tooth D′ is coiled around the pintle with its end in the notch $h'$, and the pintle, having been rotated a sufficient number of times to give the required pressure, is secured in the lug H′ and against turning therein by a burr or nut working on the threaded shank of said pintle. By this simple contrivance the elastic force of the rake-tooth may with facility be varied as circumstances may render desirable. The face of the shoulder on the pintle and the side of the lug H′ are grooved or serrated, so as to interlock with each other and restrain the pintle from turning without the necessity of screwing it up so tightly as would otherwise be necessary.

Having thus described my invention and its construction, I wish it clearly understood that I am aware that a foot-lever has been used for holding the teeth of rakes to their work; but such rakes have the rake-head pivoted so that the elevation and depression of the teeth are dependent upon the turning of the rake-head; and I am also aware that rollers have been used in connection with levers in horse-rakes; but such rollers have movable bearings, so that both the roller and its bearings move forward or back. Therefore I do not claim broadly the use of a foot-lever or roller in horse-rakes; but

What I do claim as of my invention, and desire to secure by Letters Patent, is—

1. The use of a foot-lever for holding up the rake-head of a horse-rake which has the point or center of vibration of the teeth arranged in rear of said rake-head, as herein described, and for the purpose set forth.

2. The combination of the foot-lever E with the roller $k$, said lever being so arranged that it moves back with the depression of the rake-head and forward with the elevation of said rake-head, and travels upon said roller in its back and forward motion, the bearings of said roller being rigidly fixed to the machine, as herein described and set forth.

3. Attaching the fulcrum-bar F to the cleaners or other rigid parts of the rake by means of straps $g$, connecting the two parts of a hinge-joint, so as to allow a limited amount of vertical play to the bar F, for the purpose herein described and set forth.

4. In combination with the straps $g$, the movable rings or their equivalents, for the purpose of preventing the vertical play of the bar F relatively to the cleaners under the circumstances described.

5. The extension in front of the axle of the cleaners G, which support the rake-head, so as by their vertical adjustment to regulate the height of the rake-head from the ground at a given elevation of the shafts.

6. The rotating notched pintle-bolt H $h'$, with grooves therein corresponding to similar grooves on the lug H′, for coiling the spring formed on the end of the tooth until said tooth has acquired the requisite force for holding it in the desired position, said spring being held in its coiled position by the action of the nut on the bolt, as herein described and set forth.

A. B. SPROUT.

Witnesses:
JAMES J. JOHNSTON,
ALEXANDER HAYS.